US012775985B2

(12) United States Patent
Coglitore

(10) Patent No.: US 12,775,985 B2
(45) Date of Patent: Oct. 27, 2026

(54) STOCKPAY

(71) Applicant: Carmelo Charlie Coglitore, Sydney (AU)

(72) Inventor: Carmelo Charlie Coglitore, Sydney (AU)

( * ) Notice: Subject to any disclaimer, the term of this patent is extended or adjusted under 35 U.S.C. 154(b) by 62 days.

(21) Appl. No.: 19/026,228

(22) Filed: Jan. 16, 2025

(65) Prior Publication Data

US 2025/0348942 A1 Nov. 13, 2025

(30) Foreign Application Priority Data

Feb. 2, 2024 (AU) ................................ 2024900236

(51) Int. Cl.

*G06Q 40/06* (2012.01)
*G06Q 20/32* (2012.01)
*G06Q 40/04* (2012.01)
*H04L 9/00* (2022.01)
*H04L 9/32* (2006.01)

(52) U.S. Cl.

CPC ..... *G06Q 40/0631* (2025.08); *G06Q 20/3276* (2013.01); *G06Q 40/0421* (2025.08); *H04L 9/3218* (2013.01); *H04L 9/3231* (2013.01); *H04L 9/50* (2022.05)

(58) Field of Classification Search

CPC ....... H04L 9/3218; H04L 9/3231; H04L 9/50; H04L 2209/56; H04L 9/3239; G06Q 20/0655; G06Q 20/381; G06Q 40/04

See application file for complete search history.

(56) References Cited

U.S. PATENT DOCUMENTS

| | | | | |
|---|---|---|---|---|
| 12,322,402 | B2 * | 6/2025 | Drolet | G10L 19/018 |
| 2021/0328806 | A1 * | 10/2021 | Yang | H04L 9/3247 |
| 2024/0265473 | A1 * | 8/2024 | Farzanfar | G06Q 10/40 |
| 2025/0105664 | A1 * | 3/2025 | Smith | H02J 3/38 |
| 2025/0165914 | A1 * | 5/2025 | Simms | G06Q 10/08355 |
| 2025/0348942 | A1 * | 11/2025 | Coglitore | G06Q 40/0631 |

OTHER PUBLICATIONS

Tuli et al., "Integration of Quantum Technologies into Metaverse: Applications, Potentials, and Challenges," in IEEE Access, vol. 12, pp. 29995-30019 (Year: 2024).*

* cited by examiner

*Primary Examiner* — Morshed Mehedi

(57) ABSTRACT

Provided herein a method for secure and real-time converting a volatile asset into another asset in a quantum-resistant blockchain network using an Artificial Intelligence (AI) model. The method includes receiving volatile asset conversion request and user preferences from a user through a user device, personalizing the AI model by identifying patterns and correlations between the user preference, and the real-time behavioral patterns and the historic data of the user to personalize the AI model, predicting value of each volatile asset over time using the personalized AI model, determining an optimal time to convert each volatile asset based on the predicted value of the volatile assets over time, converting each volatile asset into another asset preferred by the user, at the determined optimal time and generating a smart contract on the quantum-resistant blockchain network to secure each volatile asset's conversation into another asset.

10 Claims, 14 Drawing Sheets

400F

STOCKPAY

BACKGROUND

Technical Field

The embodiments herein generally relate to blockchain and Artificial intelligence (AI), particularly to a system and method for secure and real-time converting a volatile asset into another asset in a quantum-resistant blockchain network using an Artificial Intelligence (AI) model.

Description of the Related Art

The rapid growth of cryptocurrency markets and blockchain technologies has led to an increasing need for efficient, secure, and user-friendly systems to manage and convert digital assets. As the variety of cryptocurrencies continues to expand, so does the complexity of managing them across different blockchain protocols. Traditional methods of cryptocurrency conversion can be cumbersome, requiring manual intervention, which often results in delays, higher transaction fees, and increased risk of errors.

An existing custodial cryptocurrency system is designed to automate the conversion of cryptocurrencies into a single blockchain token. The system leverages a combination of hot and cold storage to manage custodial private keys. It handles blockchain transactions by determining network fees, signing transactions with the appropriate custodial private keys, and broadcasting them as part of a batch, reducing block confirmation monitoring resources. The system does not adapt to the individual preferences or behavior of the user, which means that its conversion process is more generalized. The system handles conversions is limited by its inability to adjust to the volatility of the assets being converted. The system predicts network fees but does not consider the fluctuating values of the converted cryptocurrencies. Another drawback of the system is its security approach. While it uses hot and cold storage to protect private keys, the system fails to secure the conversion of cryptocurrencies efficiently.

Existing method for managing cryptocurrency transactions within a cryptocurrency transfer service system. The process involves converting an amount of an asset in a user account into a virtual cryptocurrency asset backed by an equivalent value of the original asset. The system facilitates the transfer of virtual cryptocurrency from the first user to a second user not included in the initial user group, with the system's reserve ensuring the transfer is backed by assets or virtual currencies associated with the users. This reserve is managed by a cryptocurrency account server, which also updates and debits the user's account as necessary. The method also includes a rebalancing process that adjusts the reserve periodically or based on specific conditions.

The existing method primarily focuses on cryptocurrency asset management, converting traditional assets (such as fiat currency, securities, or commodities) into virtual cryptocurrency assets and facilitating their transfer. One significant disadvantage, this method pertains to securities investment decision support, which inherently comes with higher volatility and market risks. The fluctuations in cryptocurrency prices could introduce additional uncertainty and complexity into the management of the reserve and user transactions. Additionally, this method relies on a cryptocurrency reserve system, and the need for periodic rebalancing could result in increased operational overhead, especially if the reserve is not effectively managed to account for changes in asset values. The existing method requires managing private keys and ensuring the security of virtual currency transactions, which could introduce vulnerabilities, especially if the cryptocurrency system is not sufficiently robust against hacking or fraud. This method relies on a reserve system that might not be as flexible or adaptable in managing a diversified portfolio of assets. This method's rebalance mechanism is reactive, relying on predefined periods or specific conditions. This reactive nature may hinder its ability to respond quickly to market changes, particularly in volatile cryptocurrency markets.

An electronic payment processing system enables users to pay for goods or services using securities from their brokerage accounts. Users select a brokerage account and choose securities, and the system checks their value to determine if they suffice for the payment. If sufficient, the securities are sold or transferred to settle the payment. This system operates with static valuation checks and does not predict future security values. This system lacks real-time conversion optimization. This system does not use AI to analyze user behavior or predict asset values over time, making it less efficient and unsuitable for managing stocks. It also struggles with remote areas and does not support secure smart contracts for transactions.

An existing Peer-to-Peer (P2P) payment processing platform enables merchants to receive payments in cryptocurrency and fiat currency. Merchants use a point-of-sale (POS) application to split payments between crypto and fiat. The system securely manages private keys for merchant wallets and transfers funds accordingly. This solution focuses on cryptocurrency and fiat payments but does not support evaluating or converting other asset types, such as stocks. It lacks AI-based prediction and optimization for asset conversions. This system fails to manage diverse assets which reduces its versatility.

An existing blockchain-based resource transaction system records transactions on a blockchain and predicts future resource prices (e.g., electricity or products) based on demand. It completes transactions using cryptocurrency and securely tracks payments and transaction data. While it provides basic transaction security and price prediction for resources, it does not handle volatile assets like stocks or securities. It lacks AI-driven personalization or real-time prediction of asset values.

An existing distributed bond trading system facilitates secure bond trading at mid-market prices. It matches buy and sell orders using encrypted trade details, timestamps, and a matching algorithm. Trades are enriched with third-party prices and executed based on confirmations. This system is specific to bond trading and lacks functionality for converting volatile assets, such as stocks, into other asset types. It does not utilize AI for real-time prediction or optimization or offer a quantum-resistant blockchain for enhanced security. The system cannot analyze user preferences or behavior to personalize conversions.

Existing payment systems often rely on cloud-based data processing, which can introduce delays, security risks, and privacy concerns. Furthermore, the reliance on internet connectivity can limit functionality and hinder the user experience.

Accordingly, there remains a need for a more efficient system and method for mitigating and/or overcoming drawbacks associated with current methods.

SUMMARY

In view of the foregoing, an embodiment herein provides a method for secure and real-time converting a volatile asset into another asset in a quantum-resistant blockchain network using an Artificial Intelligence (AI) model. The method includes receiving, by a quantum computing volatile pay payment gateway (VP-PG) server, volatile asset conversion request and user preferences from a user through a user device. The volatile asset conversion request includes details of volatile assets to be exchanged. The user preferences include conversion thresholds, and asset preferences. The method includes personalizing, by the quantum-resistant blockchain network, the AI model by analyzing the user preference, and real-time behavioral patterns and historic data of the user and identifying patterns and correlations between the user preference, and the real-time behavioral patterns and the historic data of the user to personalize the AI model. The method includes predicting, by the quantum-resistant blockchain network, value of each volatile asset over time using the personalized AI model. The behavioural value of the volatile assets is predicted by analyzing real-time volatile asset data that is received from at least one of volatile asset servers, based on the user preferences and the volatile assets to be exchanged. The real-time volatile asset data analyzed using quantum computing principle. The method includes determining, by the quantum-resistant blockchain network, an optimal time to convert each volatile asset based on the predicted value of the volatile assets over the time. The method includes converting each volatile asset by the quantum-resistant blockchain network into another asset preferred by the user, at the determined optimal time. The method includes generating a smart contract on the quantum-resistant blockchain network to secure each volatile asset's conversation into another asset. The smart contract includes conditions for converting the volatile asset.

In some embodiments, the volatile asset conversion request is initiated when an identity (ID) of the user is verified through the quantum-resistant blockchain network using biometric authentication. The identity (ID) of the user is verified using a Zero-Knowledge Proofs (ZKPs) method.

In some embodiments, the method includes accessing the historic data of the user using the ZKPs method when personalizing the AI model.

In some embodiments, the quantum computing principles refer to the use of quantum mechanics to improve a computational power of the personalized AI model in predicting value of each volatile asset by exploiting quantum parallelism and quantum entanglement to analyze multiple scenarios simultaneously.

In some embodiments, the method includes enabling the volatile asset conversation through satellite IoT, thereby enabling high-speed volatile asset-based payment processing in remote areas. The satellite IoT is linked to a quantum computing VP-PG server that is associated with the quantum-resistant blockchain network.

In some embodiments, the personalized AI model utilizes at least one of options pricing, derivatives trading, or over-the-counter (OTC) derivatives method to predict the value of each volatile asset over time.

In some embodiments, the volatile asset is used as collateral by generating the smart contract when the predicted value of the volatile assets meets a collateral threshold.

In some embodiments, the method further includes (i) receiving, at the quantum computing VP-PG server, a volatile asset transfer request from the user device that has scanned a Quick Response (QR) code linked to an entity's identity (ID), (ii) processing the volatile asset transfer request at the VP-PG server using at least one of quantum computing methods to validate transaction data, and (iii) securely transfer the asset from the converted volatile assets of the user to the entity ID by generating the smart contract. The volatile asset transfer request includes at least one of digital signatures; an asset that needs to be transferred, the transaction data, and converted volatile assets of the user.

In some embodiments, the method further includes generating an invoice between the user and the entity using a Robotic Process Automation (RPA) when the asset is transferred to the entity ID.

In one aspect, a system for secure and real-time converting a volatile asset into another asset in a quantum-resistant blockchain network using an Artificial Intelligence (AI) model. The system includes a quantum computing volatile pay payment gateway (VP-PG) server. The quantum computing VP-PG server receives volatile asset conversion request and user preferences from a user through a user device. The volatile asset conversion request includes details of volatile assets to be exchanged. The user preferences include conversion thresholds and asset preferences. The quantum computing VP-PG server is communicatively connected to the quantum-resistant blockchain network. The quantum-resistant blockchain network includes memory that includes a set of instructions, and a processor. The processor is configured to personalize the AI model by analyzing the user preference, and real-time behavioral patterns, and historic data of the user and identifying patterns and correlations between the user preference, and the real-time behavioral patterns and the historic data of the user to personalize the AI model. The processor is configured to predict value of each volatile asset over time using the personalized AI model. The value of the volatile assets is predicted by analyzing real-time volatile asset data that is received from at least one of volatile asset servers, based on the user preferences and the volatile assets to be exchanged. The real-time volatile asset data analyzed using quantum computing principle. The processor is configured to determine an optimal time to convert each volatile asset based on the predicted value of the volatile assets over time. The processor is configured to convert each volatile asset into another asset preferred by the user, at the determined optimal time. The processor is configured to generate a smart contract on the quantum-resistant blockchain network to secure each volatile asset's conversation into another asset. The smart contract includes conditions for converting the volatile asset.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
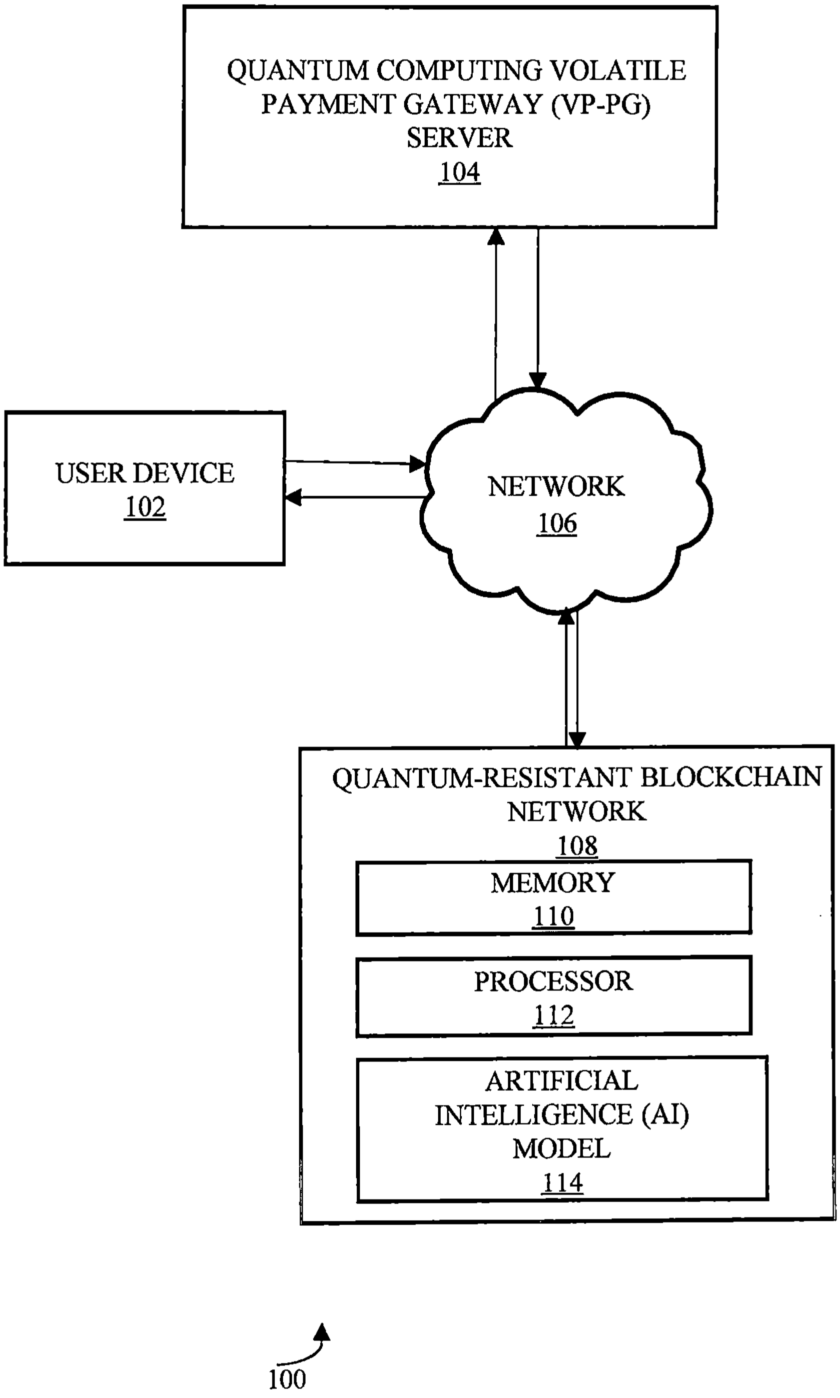
FIG. 1 illustrates a block diagram of a system for secure and real-time converting a volatile asset into another asset in a quantum-resistant blockchain network using an Artificial Intelligence (AI) model according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a method and system for secure and real-time converting a volatile asset into another asset in a quantum-resistant blockchain network using an Artificial Intelligence (AI) model according to some embodiments herein. Referring now to the drawings, and more particularly to FIGS. 1 through 6, where similar reference characters denote corresponding features consistently throughout the figure's, preferred embodiments are shown.

FIG. 1 illustrates a block diagram of a system 100 for secure and real-time converting a volatile asset into another asset in a quantum-resistant blockchain network 108 using an Artificial Intelligence (AI) model 114 according to some embodiments herein. The system 100 includes a user device 102, a quantum computing volatile payment gateway (VP-PG) server 104, and a quantum-resistant blockchain network 108. The user device 102 is communicatively connected with the quantum computing VP-PG server 104 through network 106. The user 102 provides a volatile asset conversion request and user preferences to the quantum computing VP-PG server 104 using the user device 102. The volatile asset conversion request includes details of volatile assets to be exchanged.

In some embodiments, the system 100 categorizes the volatile assets based on their types, such as the stock's industry, market capitalization, or other relevant investment factors. This classification enables efficient handling of stocks and investment instruments during transactions. For example, when the user uses a digital wallet to pay for goods or services with stocks, the system 100 identifies the class of the asset being used. This identification can be performed through methods such as analyzing the stock's ticker symbol, referencing a database of listed stocks with corresponding asset classifications, or employing machine learning algorithms to classify the stock based on its inherent characteristics.

After determining the volatile asset class, the digital wallet utilizes this information to process the payment. For example, if the payment involves a large-cap technology stock, the system 100 may automatically convert the stock to cash or cryptocurrency using a conversion rate tailored to that asset class. Similarly, if the payment involves a mid-cap pharmaceutical stock, the system 100 applies an appropriate conversion rate to ensure an accurate and fair valuation for the transaction.

The user preferences include conversion thresholds and asset preferences. The user device 102 may be handheld, a mobile phone, a Kindle, a Personal Digital Assistant (PDA), a tablet, a laptop, a computer, an electronic notebook, or a smartphone. In some embodiments, the quantum computing VP-PG server 104 receives a volatile asset transfer request from the user device 102 that has scanned a Quick Response (QR) code linked to an entity's identity (ID). The AI model 114 is trained using stock market data, monetary data, news, social media data, and derivatives and options market data. The stock data includes historical records of stock prices, trading volumes, market capitalization, and other financial metrics associated with stocks traded across various exchanges. The monetary data includes revenue, earnings, profit margins, GDP growth, inflation rates, interest rates, and financial ratios of entities. The news, and social media data include news articles and social media posts related to stocks.

The quantum computing VP-PG server 104 includes a processor and a non-transitory computer-readable storage medium (or memory) storing a database. The database may store one or more sequences of instructions, which when executed by the processor that generating a smart contract on the quantum-resistant blockchain network 108 to secure each volatile asset's conversation into another asset. The include quantum computing VP-PG server 104 may be a handheld device, a mobile phone, a Kindle, a Personal Digital Assistant (PDA), a tablet, a laptop, a computer, an electronic notebook, or a smartphone. The network 106 may be wired or a wireless network based on at least one of a 2G protocol, a 3G protocol, a 4G protocol, or a 5G protocol, Bluetooth Low Energy (BLE), Near Field Communication (NFC), Bluetooth, Wi-Fi, and a Narrow Band Internet of Things protocol (NBIoT) or a combination of the wired and the wireless network or the Internet. The network 106 may be an internet. The quantum computing VP-PG server 104 is hosted on a cloud platform. The quantum-resistant blockchain network 108 is hosted on a cloud platform. The quantum-resistant blockchain network 108 includes the AI model 114.

The quantum-resistant blockchain network 108 is communicatively connected to the quantum computing VP-PG server 104 to receive the volatile asset conversion request and user preferences. The quantum-resistant blockchain network 108 initiates the volatile asset conversion request when an identity (ID) of the user is verified through the quantum-resistant blockchain network 108 using biometric authentication. The volatile asset transfer request comprises at least one digital signature, an asset that needs to be transferred, the transaction data, and the converted volatile assets of the user. The quantum-resistant blockchain network 108 verifies identity (ID) of the user using a Zero-Knowledge Proofs (ZKPs) method. The ZKPs is a cryptographic method that allows one party (the prover or user) to prove to another party (the verifier) that a statement is true without revealing any additional information apart from the fact that the statement is indeed true.

The quantum-resistant blockchain network 108 processes the volatile asset transfer request at the VP-PG server 104 using at least one of quantum computing methods to validate transaction data. The quantum computing methods may be quantum gate model, quantum annealing, quantum parallelism, quantum algorithms, topological quantum computing, adiabatic quantum computing, adiabatic quantum computing, quantum error correction, quantum simulation, or quantum machine learning. For example, using the system's 100 mobile application on the user device 102, the user A initiates a request to convert volatile asset B into USD. The request includes volatile assets to convert (stock). the user preference for a minimum conversion rate (e.g., $30,000/stock), the target asset (USD). The system authenticates the user A using biometric verification (e.g., a fingerprint scan). The verification is securely processed using Zero-Knowledge Proofs (ZKPs) on the quantum-resistant blockchain network 108 to ensure the user A's privacy and identity security.

The quantum-resistant blockchain network 108 personalizes the AI model 114 by analyzing the user preference, and real-time behavioral patterns, and historic data of the user and identifying patterns and correlations between the user preference, and the real-time behavioral patterns and the historic data of the user to personalize the AI model 114. The quantum-resistant blockchain network 108 accesses the historic data of the user using the ZKPs method when personalizing the AI model 114.

The quantum computing VP-PG server 104 analyzes the user A real-time behavior, preferences, and historical data to personalize the AI model 114. The quantum-resistant blockchain network 108 predicts value of each volatile asset over time using the personalized AI model 114. The AI model 114 predicts the value of the volatile assets by analyzing real-time volatile asset data that is received from at least one of volatile asset servers, based on the user preferences and the volatile assets to be exchanged. The real-time volatile asset data analyzed using quantum computing principle. The quantum computing principles refer to use of quantum mechanics to improve a computational power of the personalized AI model in predicting value of each volatile asset by exploiting quantum parallelism and quantum entanglement to analyze multiple scenarios simultaneously. The personalized AI model utilizes at least one options pricing, derivatives trading, or over-the-counter (OTC) derivatives method to predict the value of each volatile asset over time.

In the system 100, the AI model 114 is utilized to evaluate the value of available stock with enhanced accuracy by leveraging advanced machine learning and data analysis techniques. The AI model 114 processes vast amounts of data from various sources, including stock exchanges, news platforms, and social media, to extract critical insights. By identifying relevant information such as stock prices, company financial metrics, and market trends, the system 100 generates actionable data to aid in stock evaluation and trading decisions.

The system 100 recognizes complex patterns in stock data. This pattern recognition capability enables the identification of trends and contributes to predicting future stock prices with greater precision. Additionally, the system 100 employs predictive analytics to forecast stock values based on historical data and emerging market trends. The system 100 incorporates natural language processing (NLP) techniques to analyze unstructured textual data from financial news articles and social media platforms. This functionality allows the system 100 to assess market sentiment, providing a deeper understanding of factors that may influence stock prices. Furthermore, use of deep learning algorithms facilitates the development of the AI model 114 capable of identifying complex interdependencies between various factors affecting stock values, enhancing the overall accuracy and reliability of stock analysis and predictions.

The personalized AI model 114 analyzes user A's historical transactions (e.g., the user A typically converts Bitcoin when its price rises above a specific threshold). The personalized AI model 114 evaluates real-time market data from cryptocurrency servers and predicts trends using quantum computing principles such as quantum parallelism (to analyze multiple scenarios simultaneously) and quantum entanglement (to find correlations in large datasets). The personalized AI model 114 predicts that stock price of the volatile asset B is likely to fluctuate between $29,800 and $31,500 over the next 3 hours, with the highest predicted price of $31,200 occurring in 90 minutes.

The quantum-resistant blockchain network 108 determines an optimal time to convert each volatile asset based on the predicted value of the volatile assets over the time. The VP-PG Server 104 calculates the optimal time for conversion based on the user A's preference for a minimum rate of $30,000/stock B. The AI model's 114 prediction that the stock B reach $31,200 in 90 minutes. The server 104 schedules the conversion to occur automatically when the stock B price reaches or exceeds $31,000 to maximize user's profits while minimizing risks.

The quantum-resistant blockchain network 108 converts each volatile asset into another asset preferred by the user, at the determined optimal time. The quantum-resistant blockchain network 108 generates a smart contract on the quantum-resistant blockchain network to secure each volatile asset's conversation into another asset. The smart contract includes conditions for converting the volatile asset. Once the stock value has been evaluated, the smart contract is created between the seller and buyer of the stock on the quantum-resistant blockchain network 108. The smart contract is a self-executing contract that contains the terms and conditions of the transaction and is stored on the blockchain, ensuring its immutability and transparency. For example, at the predicted optimal time, the stock B price reaches $31,100. The system 100 automatically executes the conversion. The smart contract is generated on the quantum-resistant blockchain network 108 to secure the transaction. The details in the smart contract include conversion rate ($31,100/stock B), timestamp of the conversion, and amount converted (stock B=$62,200). The system 100 ensures that the conversion process is immutable, tamper-proof, and fully transparent on the blockchain. After conversion, the resulting USD ($62,200) is deposited into the user A's digital wallet module, which is securely linked to the blockchain network. The quantum-resistant blockchain network 108 sends a notification to user device 102, confirming the successful conversion.

The quantum-resistant blockchain network 108 enables the volatile asset conversation through satellite Internet of Things (IoT), thereby enabling high-speed volatile asset-based payment processing in remote areas. The satellite IoT is linked to a quantum computing VP-PG server 104.

The volatile asset is used as collateral by generating the smart contract when the predicted value of the volatile assets meets a collateral threshold. The quantum-resistant blockchain network 108 securely transfers the volatile asset from the converted volatile asset of the user to the entity ID by the smart contract. In some embodiments, the system includes (i) a brokerage host is used to execute the stock transaction and change the status of the transaction in the smart contract and (ii) an investment host is used to execute the funds transaction and change the status of the transaction in the smart contract, and (iii) an intermediary bank host is coupled to the quantum-resistant blockchain network 108 and is used to use the smart contract as collateral for financing according to the established fund transaction.

In some embodiments, the system 100 for streamlining payment processes between buyers and sellers, including entities, or individuals. This is achieved by utilizing invoices stored within a hybrid cloud architecture integrated with the Internet of Things (IoT). The system 100 further incorporates a Robotic Process Automation (RPA) to facilitate the transaction process, enabling customers to utilize available stock to settle payments for goods and services in real-time. This process enhances the efficiency and automation of payment handling, reducing the manual intervention required in transaction management.

The quantum-resistant blockchain network 108 generates an invoice between the user and the entity using the RPA when the asset is transferred to the entity ID. The RPA interacts directly with applications of the system to execute tasks such as data entry, processing transactions, and generating reports with high speed and accuracy.

Figure 2:
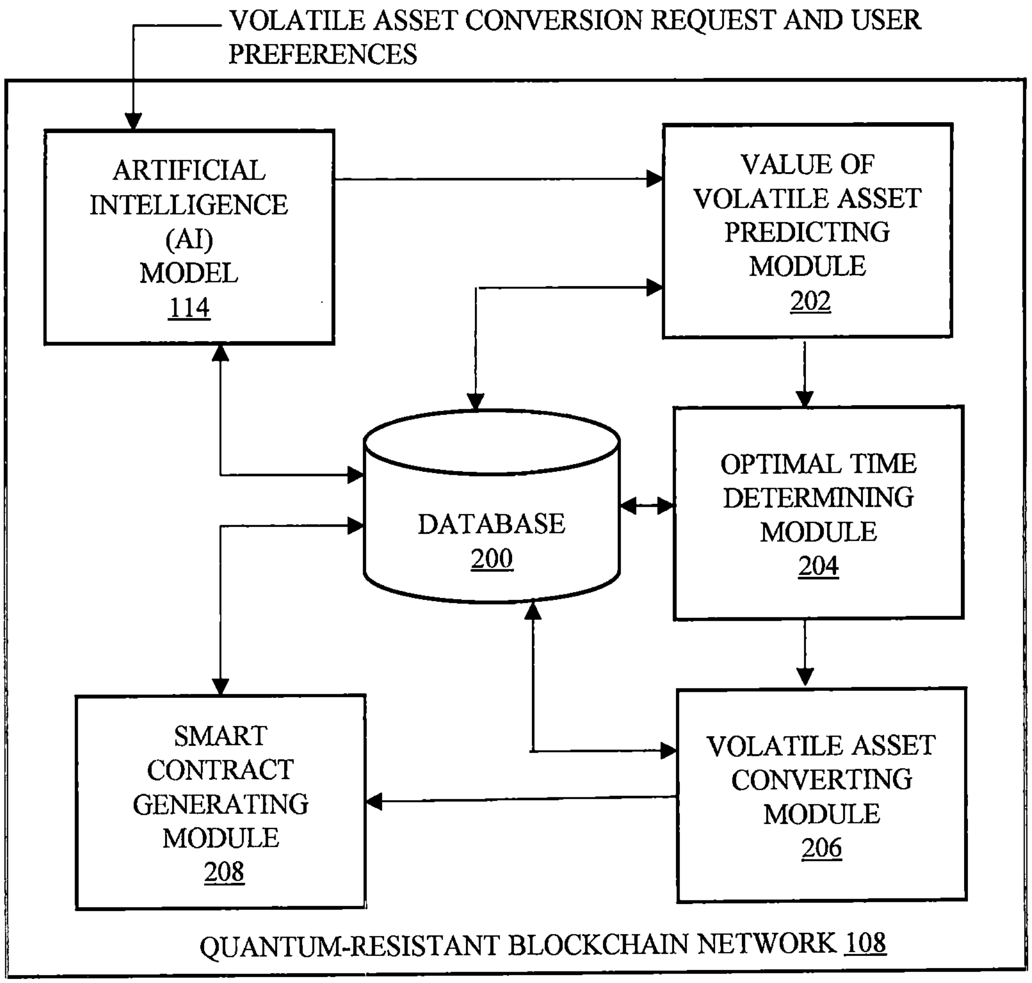
FIG. 2 illustrates a block diagram of a quantum-resistant blockchain network according to some embodiments herein.

FIG. 2 illustrates a block diagram of a quantum-resistant blockchain network 104 according to some embodiments herein. The quantum-resistant blockchain network 104 includes an Artificial Intelligence (AI) model 114, a value of volatile asset predicting module 202, an optimal time determining module 204, a volatile asset converting module 206, a smart contract generating module 208, and a database 200 that includes a set of instructions. The quantum-resistant blockchain network 104 receives volatile asset conversion request and user preferences from a user through a quantum computing volatile pay payment gateway (VP-PG) server. The volatile asset conversion request includes details of volatile assets to be exchanged. The user preferences include conversion thresholds and asset preferences. The quantum-resistant blockchain network 104 personalizes the AI model 114 by analyzing the user preference, real-time behavioral patterns, and historic data of the user and identifying patterns and correlations between the user preference, and the real-time behavioral patterns and the historic data of the user to personalize the AI model 114. The value of volatile asset predicting module 202 predicts value of each volatile asset over time using the personalized AI model. The value of the volatile assets is predicted by analyzing real-time volatile asset data that is received from at least one of volatile asset servers, based on the user preferences and the volatile assets to be exchanged. The real-time volatile asset data analyzed using quantum computing principle.

The optimal time determining module 204 determines an optimal time to convert each volatile asset based on the predicted value of the volatile assets over the time. The volatile asset converting module 206 converts each volatile asset into another asset preferred by the user, at the determined optimal time. The smart contract generating module 208 generates a smart contract on the quantum-resistant blockchain network to secure each volatile asset's conversation into another asset. The smart contract includes conditions for converting the volatile asset. Once the terms of the smart contract are met, such as the payment being made and the stocks being transferred to the buyer, the smart contract automatically executes the transaction. This eliminates the need for intermediaries such as banks or brokers, and reduces the risk of fraud or errors in the transaction. The conditions of the conversion, such as the exchange rate and the currency to be received. Once the terms of the smart contract are met, the conversion is automatically executed, and the buyer receives the agreed-upon currency. The use of smart contracts in the volatile asset ensures that transactions are executed automatically and transparently, without the need for intermediaries, and reduces the risk of fraud or errors in the transaction.

Figure 3:
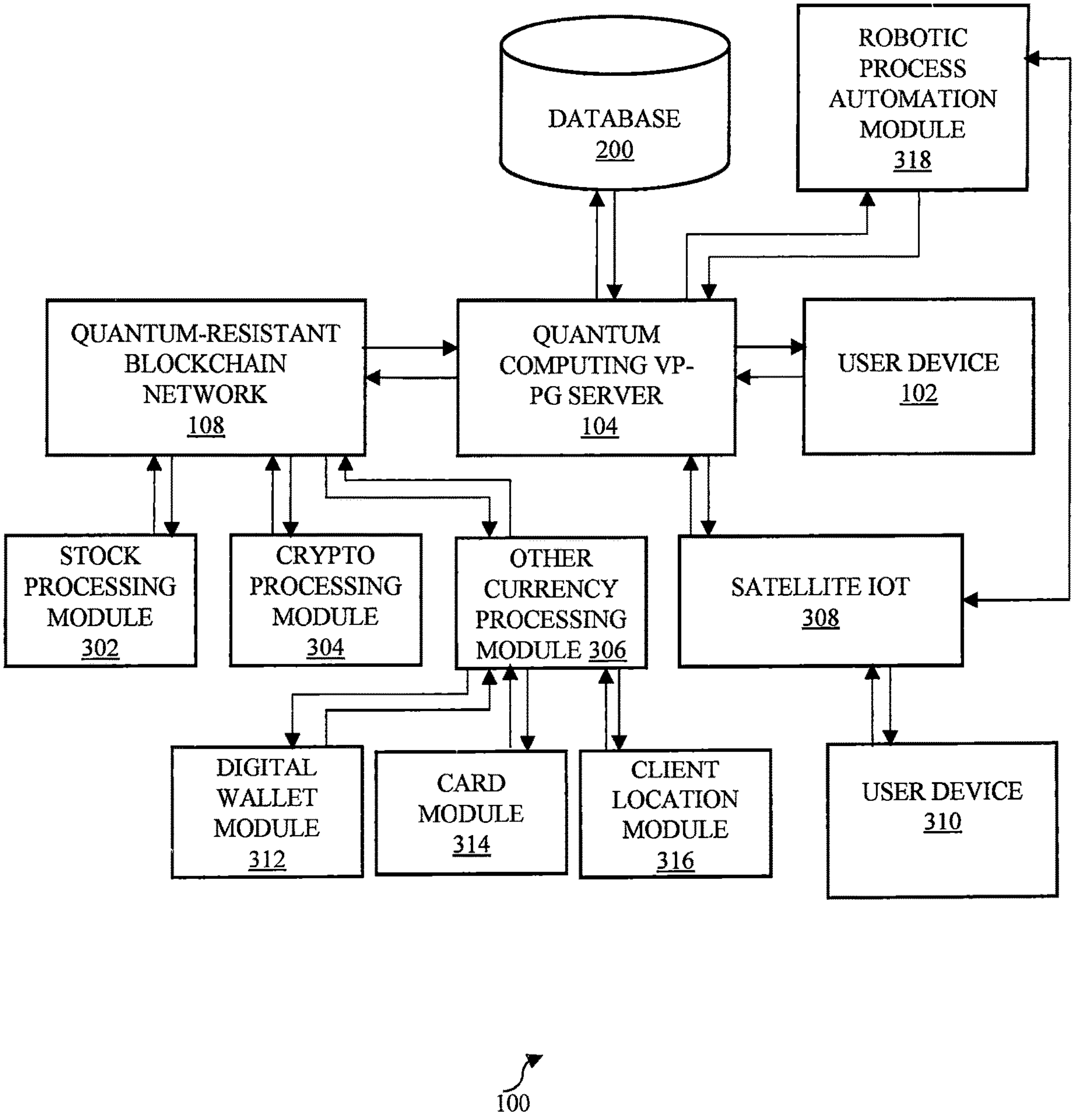
FIG. 3 illustrates an exploded view of a system of FIG. 1 according to some embodiments herein.

FIG. 3 illustrates an exploded view of a system 100 of FIG. 1 secure and real-time conversion of volatile assets into other assets using a quantum-resistant blockchain network, artificial intelligence (AI), and quantum computing principles according to some embodiments herein. The system 100 includes a quantum-resistant blockchain network 108, a quantum computing VP-PG server 104, a database 200, a user device 102, and a robotic process automation module 318. The quantum-resistant blockchain network 108 is linked to a stock processing module 302, a crypto processing module 304, and another currency processing module 306. The quantum computing VP-PG server 104 is linked to a satellite Internet of Internet (IoT) 308. The other currency processing module 306 includes wallet module 312, a card module 314, and a client location module 316. The satellite IoT 308 is linked to user device 310. The user device 310 is in the remote areas. The system 100 ensures secure, efficient, and personalized asset conversion by leveraging advanced AI-driven predictions, biometric authentication, satellite IoT, and smart contract generation. It is designed to operate seamlessly across various asset types, including cryptocurrencies, fiat currencies, and other financial instruments.

The satellite IoT 308 network facilitates communication between the digital wallet module 312, and the quantum computer VP-PG server 104, especially in remote locations. This network utilizes low-power, wide-area network (LPWAN) technologies, such as LoRaWAN and Sigfox, which support long-range communication with minimal power consumption.

The operation of the satellite IoT 308 network involves transmitting LPWAN signals from the digital wallet module 312 to a satellite. The satellite IoT 308 relays these signals to a ground station, which is connected to the VP-PG server 104. This configuration enables seamless data exchange between the components of the system 100, ensuring uninterrupted functionality in areas with limited or no internet connectivity. By leveraging the satellite IoT 308, the system 100 can provide payment processing to users in geographically isolated regions. Additionally, the satellite IoT 308 network provides a secure and reliable communication infrastructure.

The quantum computing VP-PG server 104 receives volatile asset conversion requests and user preferences from the user device 102. The conversion requests include details of the volatile assets to be exchanged, while the user preferences specify thresholds and preferred assets. The VP-PG server 104 is communicatively connected to the Quantum-Resistant Blockchain Network 108, which secures the conversion process by generating smart contracts that include predefined conditions. The VP-PG server 104 uses quantum computing principles, such as quantum parallelism and entanglement, to predict asset values over time by analyzing real-time data from volatile asset servers, user preferences, and historical data. The system 100 not only supports real-time volatile asset conversion but also facilitates secure asset transfers. The VP-PG server 104 processes transfer requests by validating transaction data using quantum computing methods. The transfer data includes digital signatures, transaction details, and the converted asset balance. Once validated, the asset is securely transferred to the recipient's entity ID, and a smart contract is generated to document the transaction.

The quantum-resistant blockchain network 108 ensures the security and transparency of all transactions. The quantum-resistant blockchain network 108 uses biometric authentication and Zero-Knowledge Proofs (ZKPs) to verify user identity (ID) while maintaining privacy. The ZKPs method also enables secure access to the user's historic data for personalizing the AI model used by the VP-PG server. The AI model analyzes user preferences, real-time behavioral patterns, and historic data to identify patterns and correlations, thereby optimizing predictions for volatile asset conversion.

To enable remote accessibility, the system 100 incorporates a Satellite IoT module 308, which facilitates high-speed asset conversion and payment processing in areas with limited connectivity. The satellite IoT module 308 communicates with the VP-PG server 104 and the blockchain network 108, ensuring uninterrupted service even in remote locations. The system 100 also includes a crypto processing module 304 for managing cryptocurrency transactions and another currency processing module 306 for handling fiat currencies and other traditional financial instruments.

The user devices 102, and 310 serve as the interface for initiating volatile asset conversion requests and transfers. The user can scan Quick Response (QR) codes linked to entity identities to enable secure transfers. The quantum computing volatile payment gateway platform (VP-PG) server 104 is implemented in merchant outlets. Once integrated, the VP-PG server 104 facilitates transaction processing by generating the QR code for each payment initiated by the user. The user scans the QR code using their mobile device to begin the payment process. The VP-PG server 104 then processes the transaction and updates its status on the blockchain network 108 upon completion, ensuring transparency and traceability.

The digital wallet module 312 maintains the converted asset balance, allowing users to store and manage digital assets securely. The card module 314) ensures compatibility with traditional payment methods, such as credit or debit cards, for greater versatility The system 100 also integrates a Robotic Process Automation (RPA) module 318, which automates workflows related to asset conversion and transaction processing. For example, the RPA module 318 generates invoices automatically when assets are transferred to an entity ID. Additionally, the client location module 316 verifies the user's geographic location, adding a layer of fraud prevention and enabling geolocation-specific services.

The conversion process is driven by the quantum-resistant blockchain network 108, which determines the optimal time for converting volatile assets by analyzing predicted values. The personalized AI model 114 within the server 104 employs techniques such as options pricing, derivatives trading, and over-the-counter (OTC) derivatives to enhance prediction accuracy. Furthermore, the system 100 allows assets, such as stocks, to be used as collateral by generating smart contracts when the predicted asset value meets predefined thresholds.

Figure 4A:
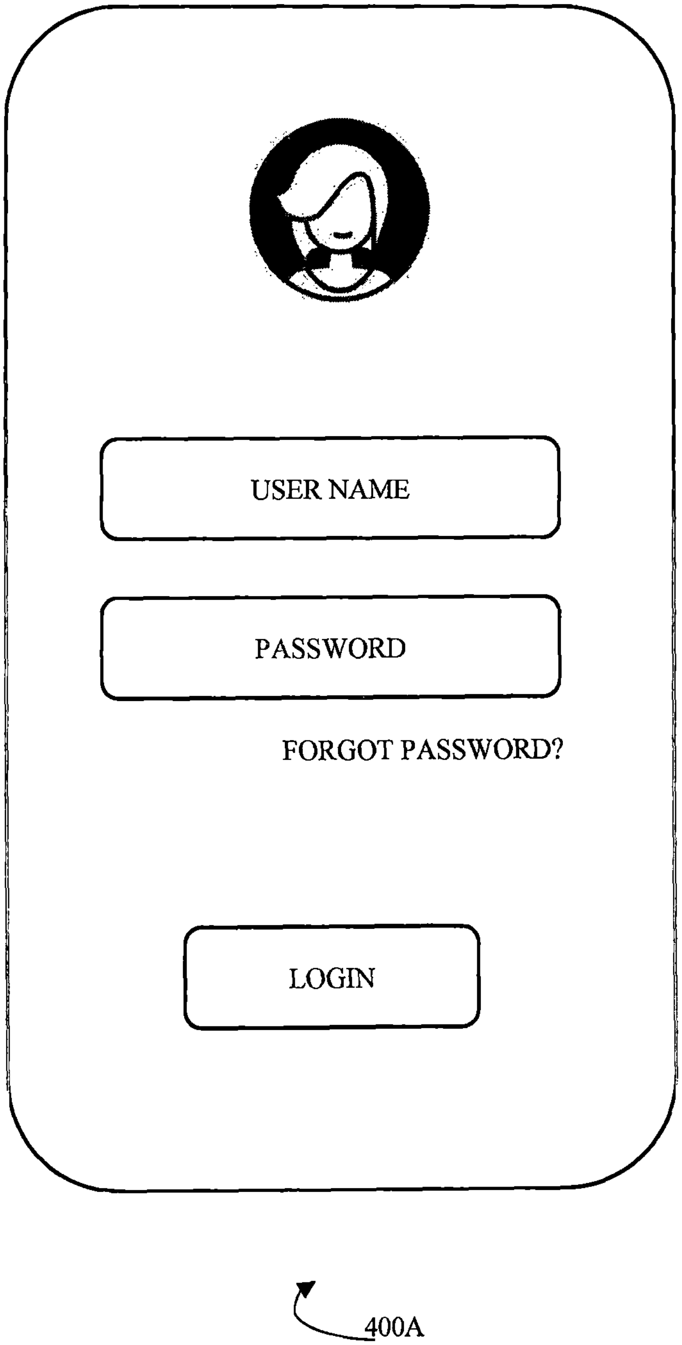
FIG. 4A illustrates an exemplary user interface view for a secure login system according to some embodiments herein.

FIG. 4A illustrates an exemplary user interface 400A view for a secure login system according to some embodiments herein. The user interface 400A depicts field for "user name", field for "password" and "login". This input field allows a user to enter their username. This input field enables secure entry of the user's password. Upon clicking "login", the user interface 400A displays "Welcome screen".

Figure 4B:
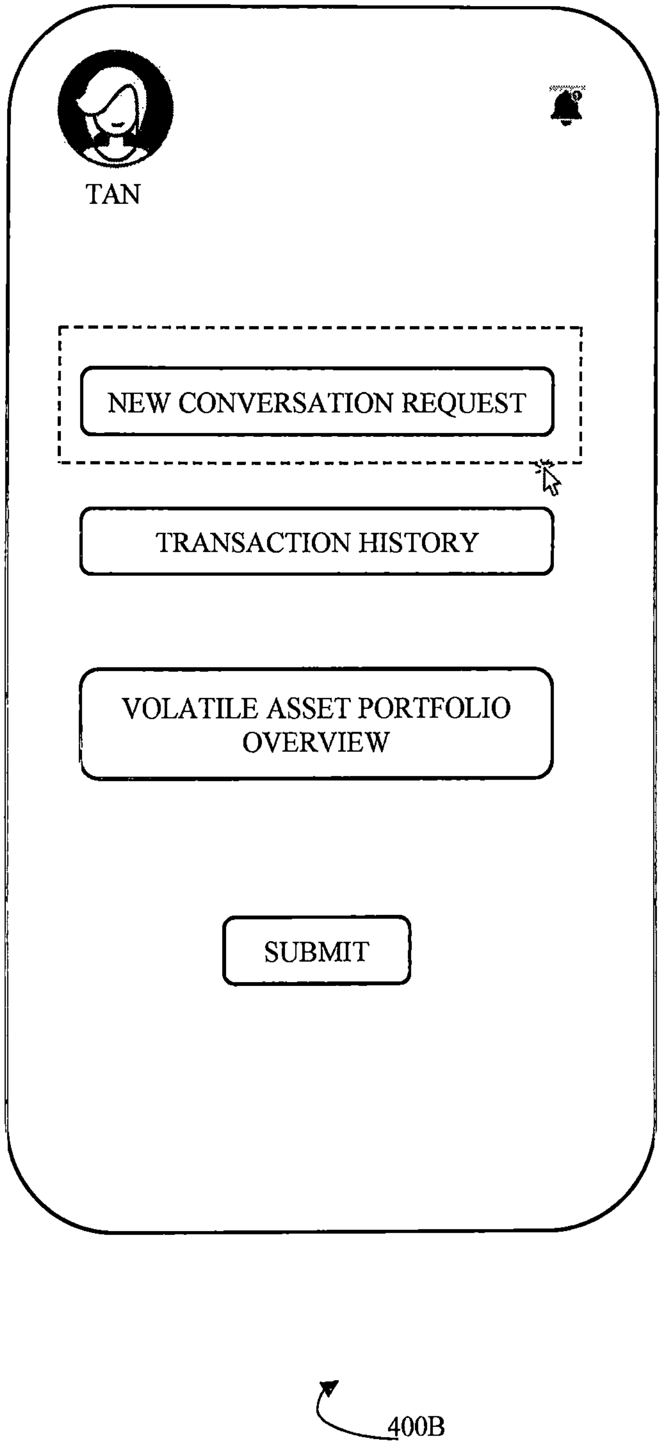
FIG. 4B illustrates an exemplary user interface view for initiating various actions in the system according to some embodiments herein.

FIG. 4B illustrates an exemplary user interface 400B view for initiating various actions in the system according to some embodiments herein. The user interface 400B depicts "the user profile, including a "profile picture" and the "user name" ("TAN"), for user identification and personalization". "Notification icon" provides access to system notifications, including alerts or updates relevant to the user, and "action buttons". The action button includes "New Conversation Request" button enables the user to initiate a new stock conversation the request, "Transaction History Button" which allows the user to view historical records of transactions or actions performed in the system, "Volatile Asset Portfolio Overview" Button provides access to a detailed overview of the user's volatile asset portfolio". When the user selects "New Conversation Request", then clicks the "submit", this button confirms the selected action and proceeds to the next step.

Figure 4C:
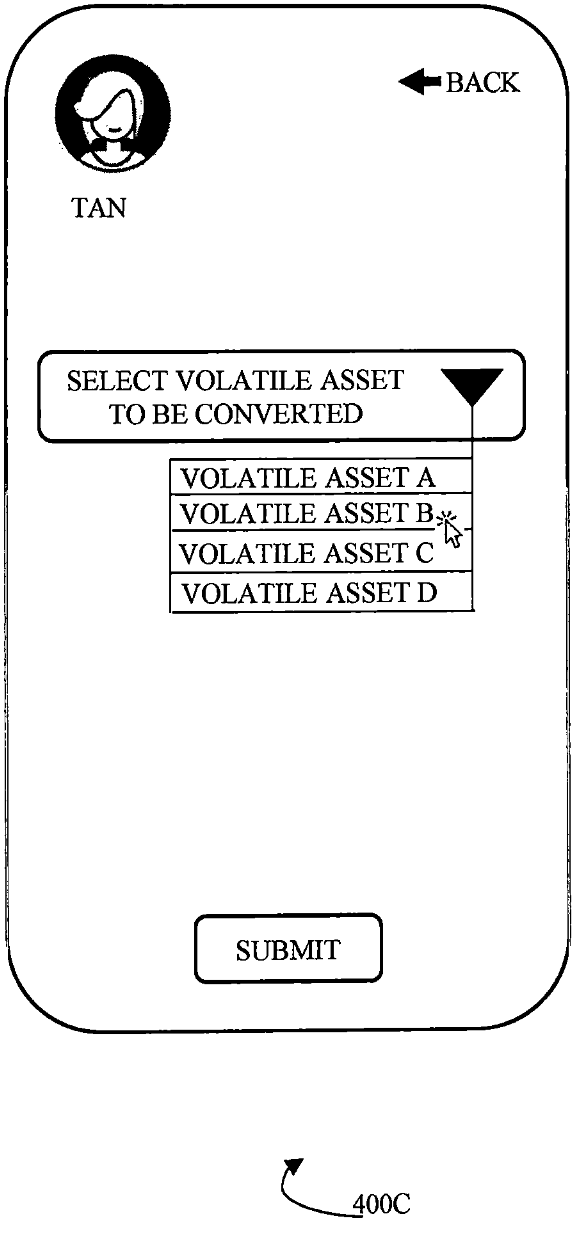
FIG. 4C illustrates an exemplary user interface view for selecting a specific volatile asset to be converted according to some embodiments herein.

FIG. 4C illustrates an exemplary user interface 400C view for selecting a specific volatile asset to be converted according to some embodiments herein. The user interface 400C depicts volatile asset selection dropdown menu. The dropdown menu is labeled "Select Volatile Asset to Be Converted" and provides a list of available volatile assets for user selection. The menu includes options such as: "Volatile Asset A", "Volatile Asset B", "Volatile Asset C", and "Volatile Asset D". For example, the user selects the "Volatile Asset 2", and click "submit". The user interface 400C ensures that users can easily specify the asset they intend to process, supporting accurate and efficient management of volatile assets.

Figure 4D:
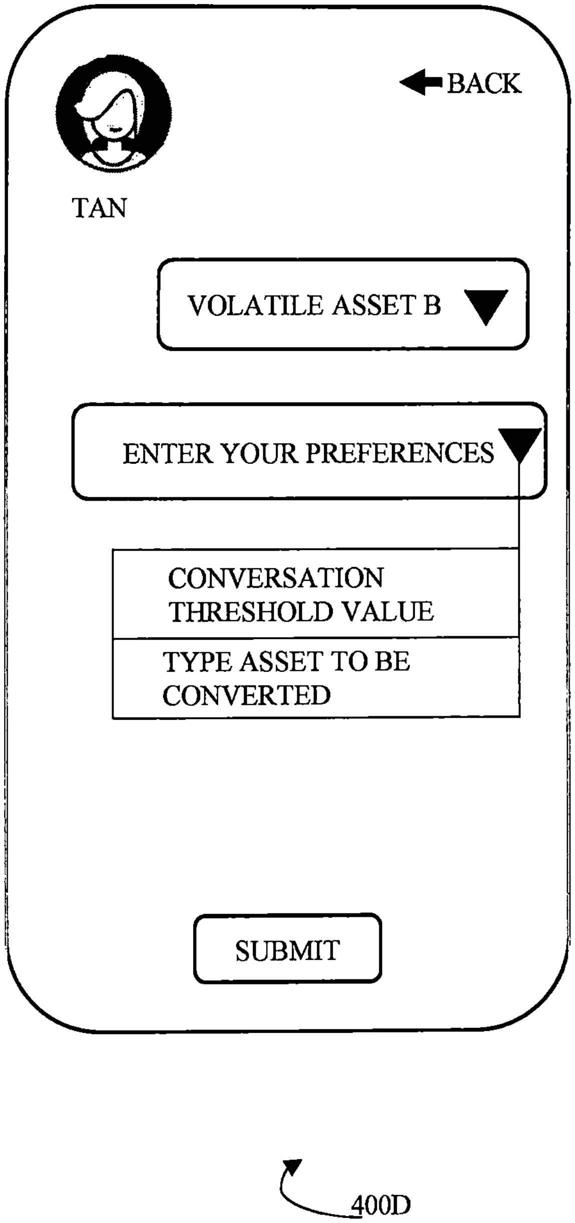
FIG. 4D illustrates an exemplary user interface view for configuring preferences related to the conversion of a volatile asset selected in the previous step according to some embodiments herein.

FIG. 4D illustrates an exemplary user interface 400D view for configuring preferences related to the conversion of a volatile asset selected in the previous step according to some embodiments herein. The user interface 400D depicts the volatile asset previously selected by the user, allowing for review or modification before proceeding. The user interface 400D depicts a preferences configuration dropdown menu that is labeled "Enter Your Preferences," this dropdown menu allows the user to configure specific parameters for the conversion process. The options include: "Conversation Threshold Value" which means threshold parameter that defines specific conditions for asset conversion, and "Type Asset to Be Converted" which allows the user to specify the type of asset for the conversion process. The user enters "Conversation Threshold Value" confirms the configured preferences and "Type Asset to Be Converted" and then initiates the processing of the volatile asset by clicking "submit".

Figure 4E:
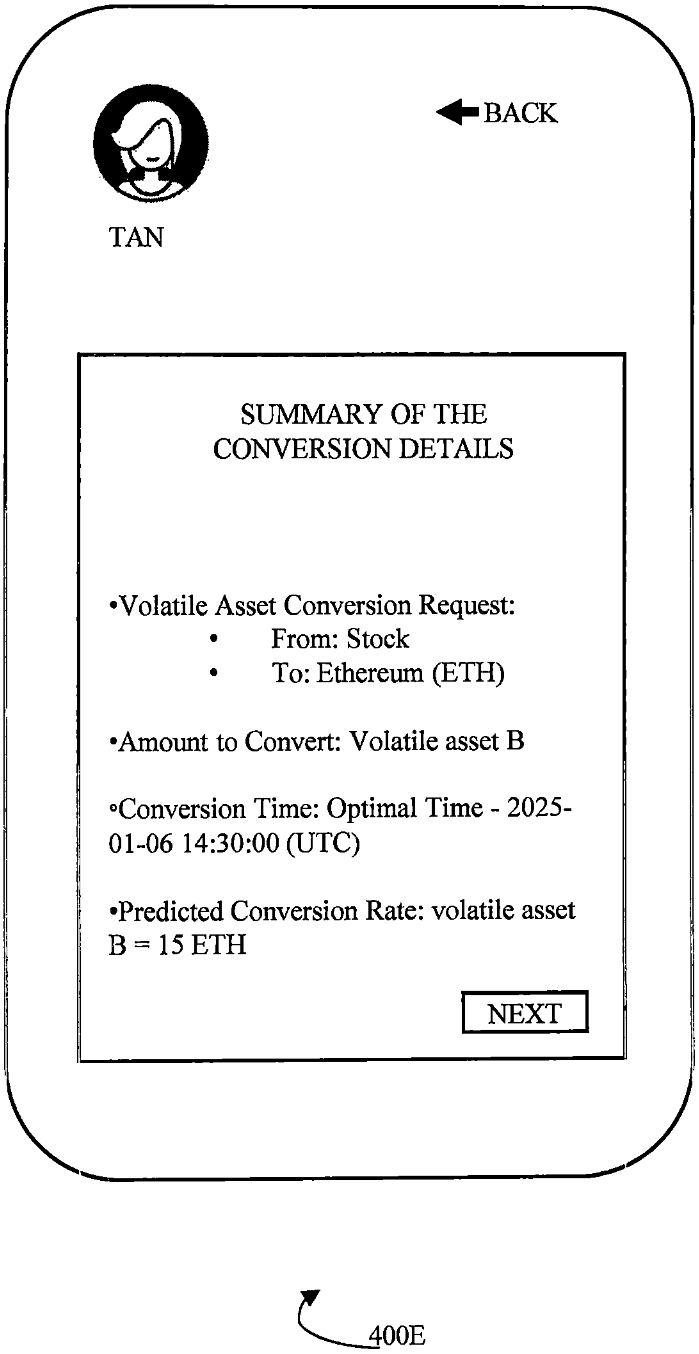
FIG. 4E illustrates an exemplary user interface view for summarizing the details of a volatile asset conversion request according to some embodiments herein.

FIG. 4E illustrates an exemplary user interface 400E view for summarizing the details of a volatile asset conversion request according to some embodiments herein. The user interface 400E depicts parameters related to the requested conversion, including "Asset Conversion Details" which specifies the assets involved in the conversion process, namely stock as the source asset and Ethereum (ETH), as the target asset, "Amount to Convert" a specific amount of the source volatile asset to be converted, which is volatile asset B, "Optimal Conversion Time" which is determined by the system for conversion using AI-based predictions, displayed as Jan. 6, 2025, at 14:30 UTC, "Predicted Conversion Rate" means anticipated exchange rate, displayed as the volatile asset B=15 ETH.

Figure 4F:
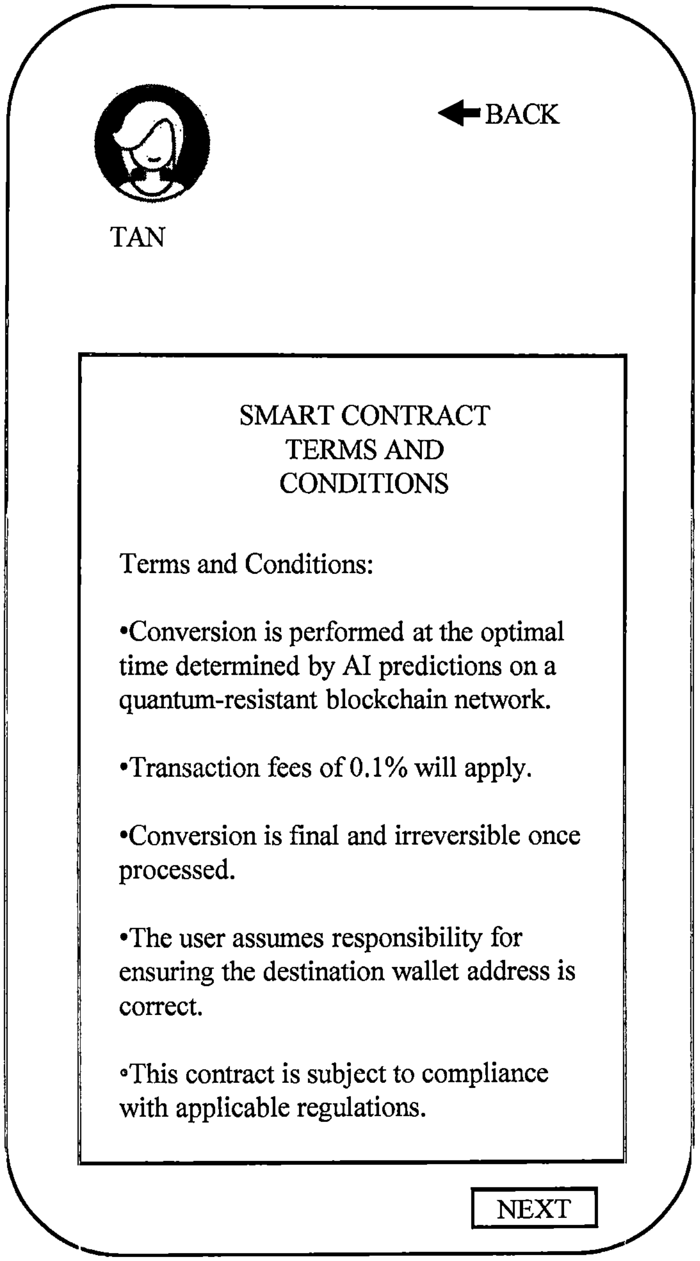
FIG. 4F illustrates an exemplary user interface view for smart contract terms and conditions associated with the volatile asset conversion according to some embodiments herein.

FIG. 4F illustrates an exemplary user interface 400F view for smart contract terms and conditions associated with the volatile asset conversion according to some embodiments herein. The user interface 400F depicts terms and conditions including "AI-Driven Optimal Timing" means conversion is executed at the optimal time determined by a personalized AI model on a quantum-resistant blockchain network, "Transaction Fees" a fee of 0.1% of the transaction amount is applied, "irreversibility of conversion" the conversion process is final and cannot be reversed once initiated and processed, "user is required to verify the accuracy of the destination wallet address, as the system does not assume liability for errors in the provided address" and "the smart contract adheres to applicable regulations governing blockchain-based asset conversions".

Figure 4G:
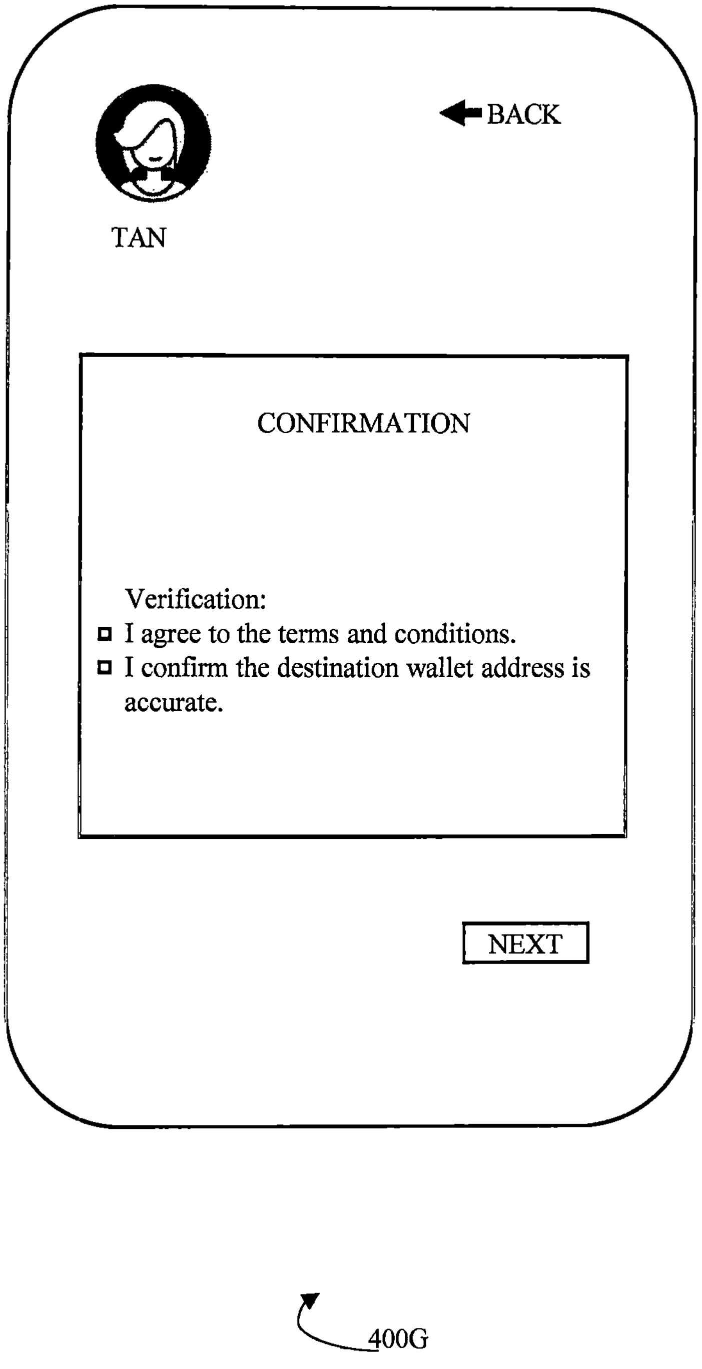
FIG. 4G illustrates an exemplary user interface view which requires the user to verify their consent and agreement with the terms and conditions before the transaction is processed according to some embodiments herein.

FIG. 4G illustrates an exemplary user interface 400G view which requires the user to verify their consent and agreement with the terms and conditions before the transaction is processed according to some embodiments herein. The user interface 400G depicts verification checkboxes: The user must explicitly agree to the terms and conditions of the conversion process, and confirm that the destination wallet address provided is accurate and free of errors. The user can proceed to finalize the transaction by selecting the "NEXT" button.

Figure 4H:
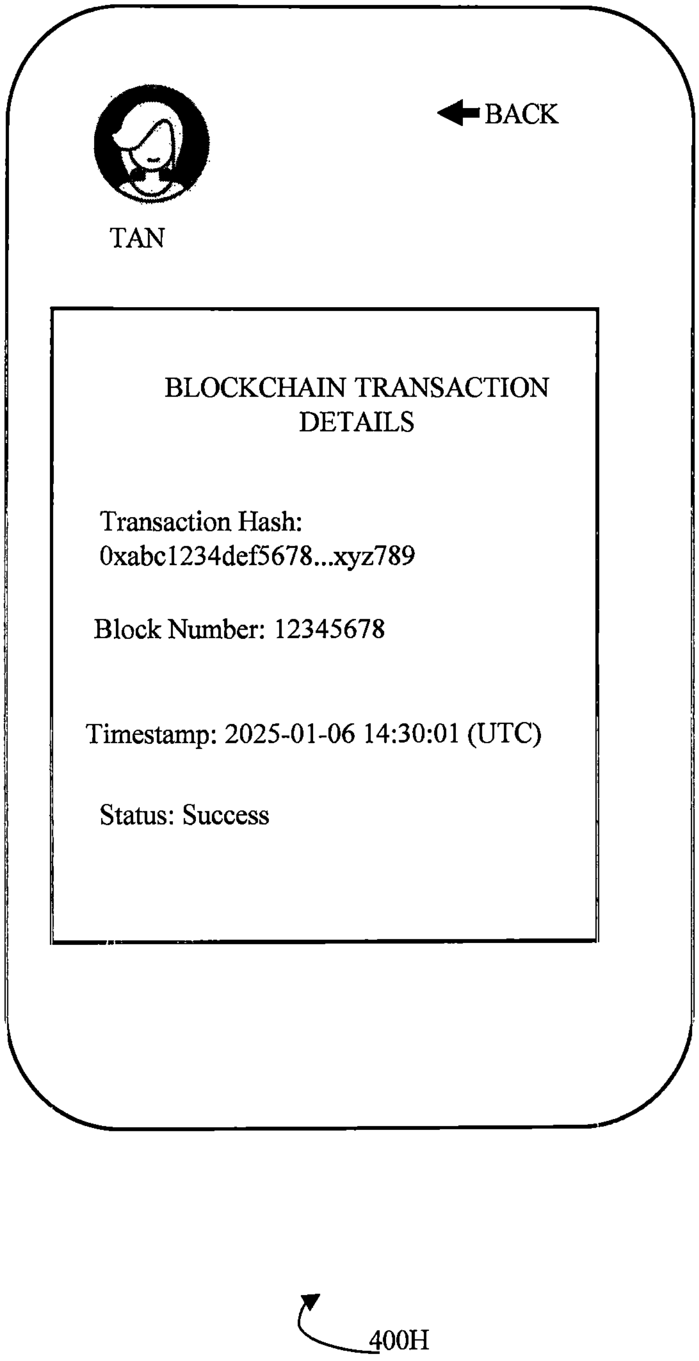
FIG. 4H illustrates an exemplary user interface view that displays blockchain transaction details for the selected and converted asset according to some embodiments herein

FIG. 4H illustrates an exemplary user interface 400H view that displays blockchain transaction details for the selected and converted asset according to some embodiments herein. The user interface 400H depicts blockchain transaction details "Transaction Hash: 0xabc1234def5678 . . . xyz789", "Block Number: 12345678", "Timestamp: 2025 Jan. 6 14:30:01 (UTC)", and "Status: Success".

Figure 5A:
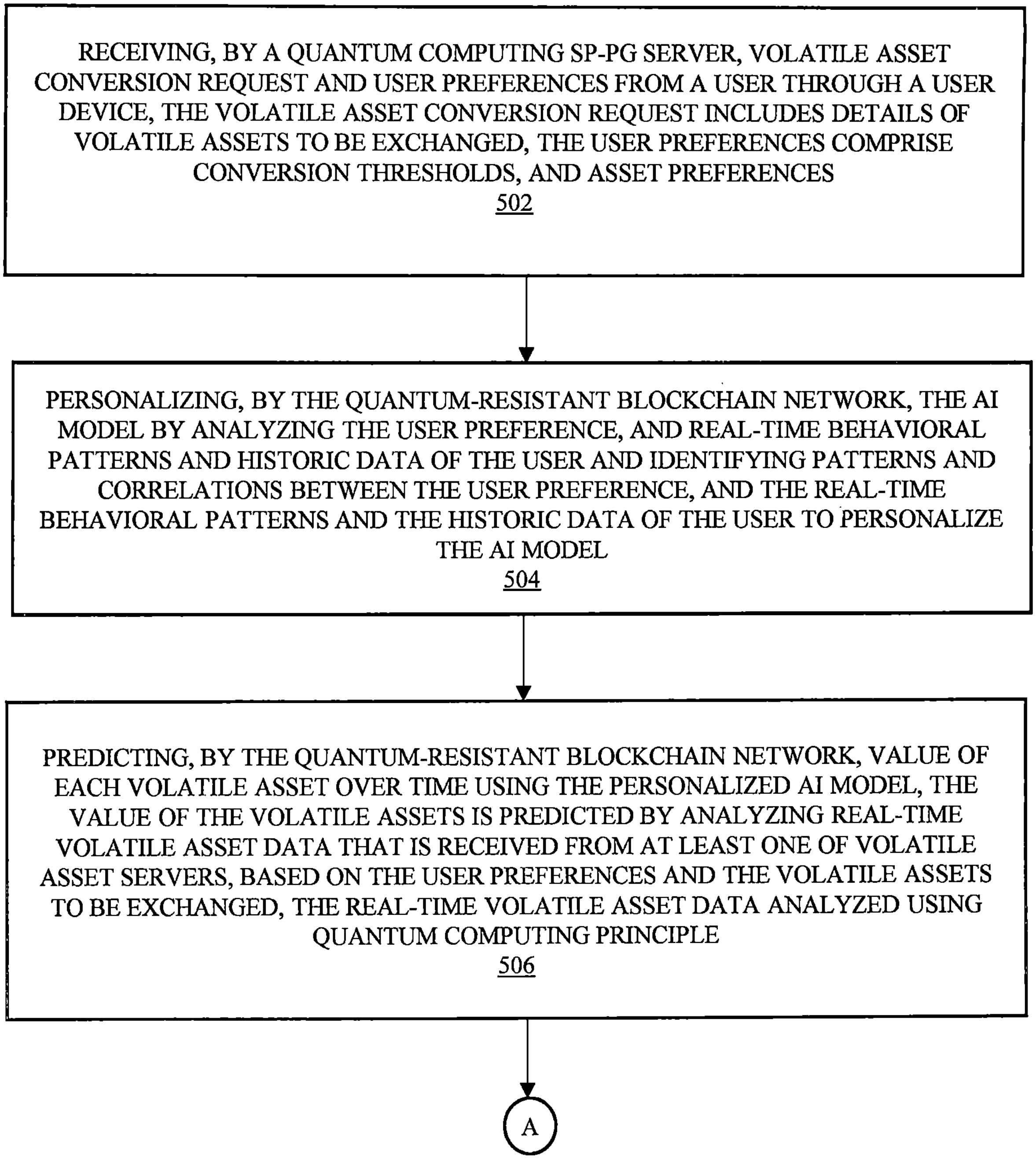
FIGS. 5A and 5B are flow diagrams that illustrate a method for secure and real-time converting a volatile asset into another asset in a quantum-resistant blockchain network using an Artificial Intelligence (AI) model according to some embodiments herein.
Figure 5B:
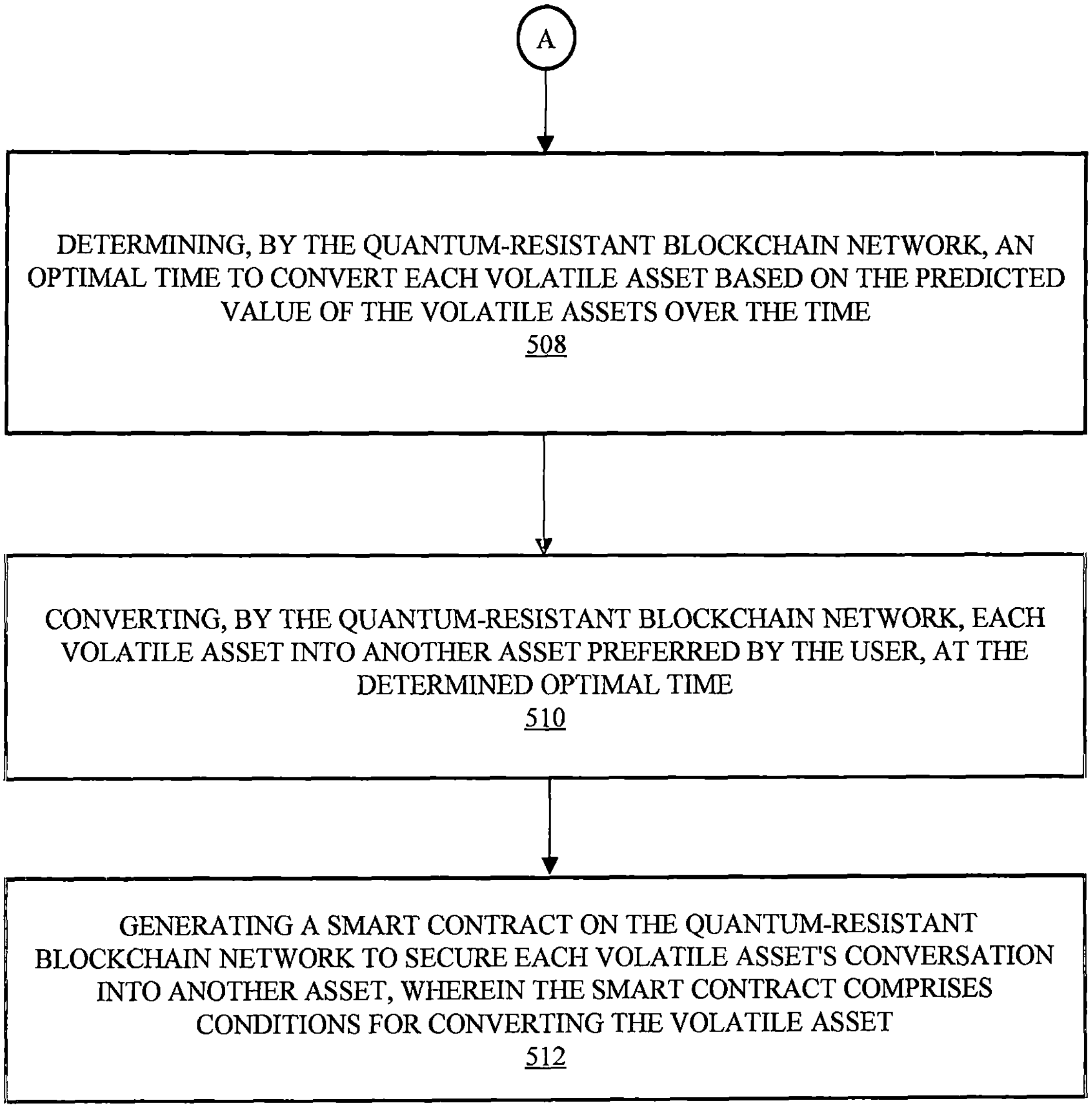

FIGS. 5A and 5B are flow diagrams that illustrate a method for secure and real-time converting a volatile asset into another asset in a quantum-resistant blockchain network using an Artificial Intelligence (AI) model according to some embodiments herein. At a step 502, receiving, by a quantum computing volatile pay payment gateway (VP-PG) server, volatile asset conversion request and user preferences from a user through a user device. The volatile asset conversion request includes details of volatile assets to be exchanged. The user preferences include conversion thresholds and asset preferences. At a step 504, personalizing, by the quantum-resistant blockchain network, the AI model by analyzing the user preference, and real-time behavioral patterns and historic data of the user and identifying patterns and correlations between the user preference, and the real-time behavioral patterns and the historic data of the user to personalize the AI model.

At a step 506, predicting, by the quantum-resistant blockchain network, value of each volatile asset over time using the personalized AI model. The value of the volatile assets is predicted by analyzing real-time volatile asset data that is received from at least one of volatile asset servers, based on the user preferences and the volatile assets to be exchanged. The real-time volatile asset data analyzed using quantum computing principle. At a step 508, determining, by the quantum-resistant blockchain network, an optimal time to convert each volatile asset based on the predicted value of the volatile assets over time. At a step 510, converting, by the quantum-resistant blockchain network, each volatile asset into another asset preferred by the user, at the determined optimal time. At a step 512, generating a smart contract on the quantum-resistant blockchain network to secure each volatile asset's conversation into another asset. The smart contract includes conditions for converting the volatile asset.

The AI model processing occurs directly on the user's device. This on-device processing eliminates the need to transmit data to external cloud servers, enhancing performance and privacy. The AI models, such as neural networks, are initially trained in the cloud but are subsequently optimized to run locally on the device's processor. This allows the AI features to operate offline, ensuring that user data, including photos, voice recordings, text inputs, and activity patterns, remain private and secure within the device. The system integrates on-device AI with the hybrid cloud, IoT, and RPA technologies to optimize payment processing. The AI processing capabilities within the device enable the handling of invoicing, payment tracking, and transaction verification in real-time, without the need for continuous internet access. This localized processing results in faster, more secure, and more efficient user payment experiences. Moreover, the hybrid cloud and IoT integration allows for seamless synchronization between devices, ensuring that payment data remains accurate and up-to-date across the system.

Incorporating on-device AI model into the payment platform not only enhances privacy, security, and performance but also enables personalized, context-aware experiences that adapt to the individual needs of each user. The use of on-device AI model offers several notable advantages (i) user data remains confidential as it is processed locally on the device, thus reducing the exposure to third-party cloud services (ii) sensitive user data is stored on the device, minimizing the risk of hacking or data breaches associated with cloud storage and transmission. The AI model does not require an active internet connection to function, enabling consistent and reliable intelligent features even in offline scenarios. The on-device AI model allows for near-instantaneous processing, eliminating network delays and improving the overall responsiveness of the payment system. By analyzing user data locally, the system can provide context-aware AI recommendations, tailored notifications, and personalized payment experiences for each user.

The AI model is integrated into the user's device to optimize various functions related to payment processing and user interaction. specific applications include: (i) voice assistants process certain queries locally, reducing the need to transmit voice data to the cloud, thereby enhancing privacy and response times, (ii) The on-device AI model processes camera inputs, including scene recognition, face detection, and object identification, to enhance the quality of photos and videos relevant to transaction documentation, (iii) the AI model run locally on the device to generate word predictions and text recommendations, streamlining the user experience during data entry, (iv) the AI model embedded within the device processes messages, searches, and other text-based inputs, improving the accuracy of responses and transactions using Natural Language processing (NLP), (v) the on-device AI model supports motion tracking, environmental analysis, and points-of-interest identification using Augmented Reality (AR) and Virtual Reality (VR), enabling interactive and immersive experiences for the user during payment processing.

By analyzing and processing extensive datasets from these sources, the AI model can identify patterns and correlations, enabling it to make informed and accurate predictions about future stock prices and market trends. The integration of diverse data sources ensures a comprehensive approach to stock evaluation within the system.

Figure 6:
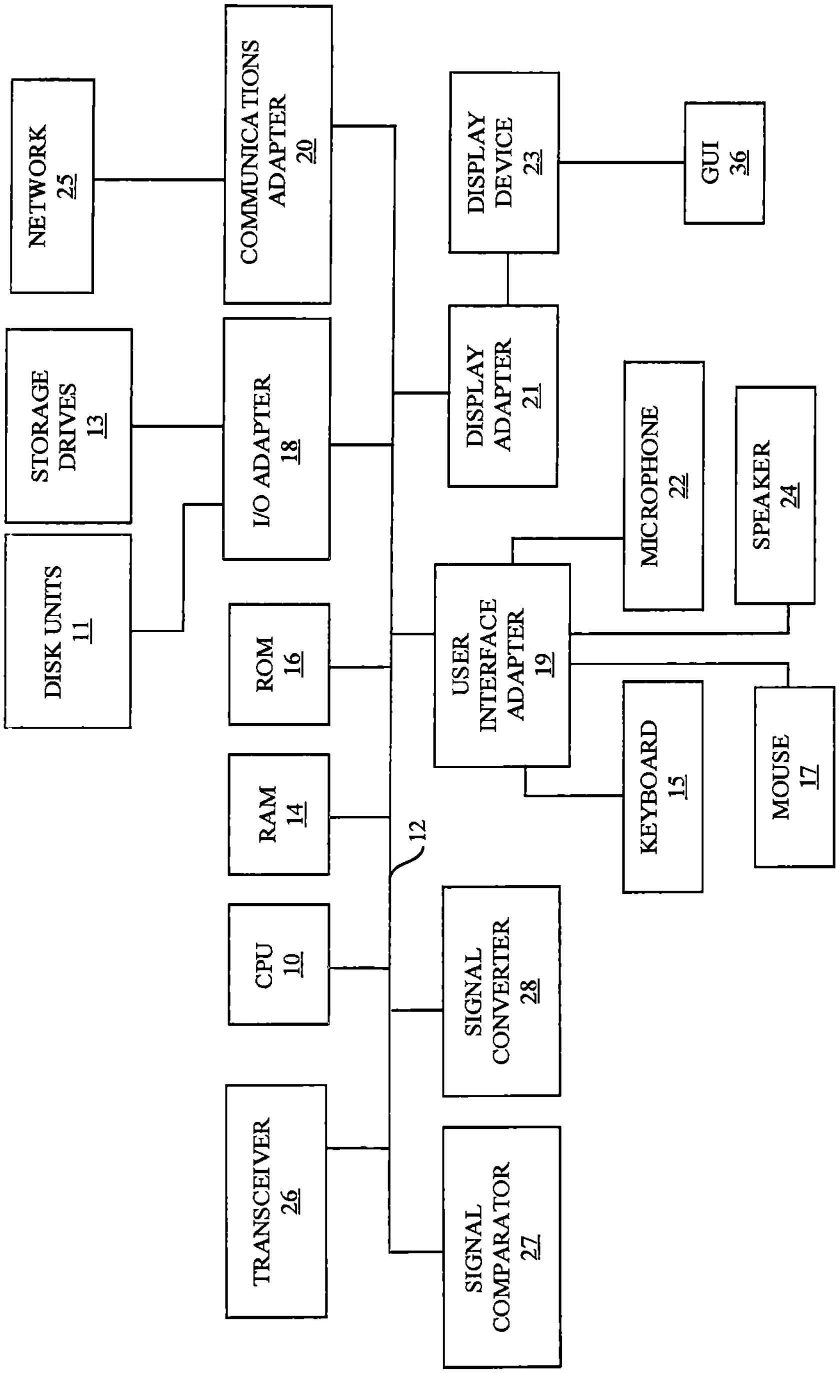
FIG. 6 is a schematic diagram of a computer architecture in accordance with the embodiments herein.

FIG. 6 is a schematic diagram of a system in accordance with the embodiments herein. A representative hardware environment for practicing the embodiments herein is depicted in FIG. 7, with reference to FIGS. 1 through 5A and 5B. This schematic drawing illustrates a hardware configuration of a quantum-resistant blockchain network/quantum computing SP-PG server/computer system/computing device in accordance with the embodiments herein. The system includes at least one processing device CPU 10 that may be interconnected via system bus 14 to various devices such as random-access memory (RAM) 12, read-only memory (ROM) 16, and an input/output (I/O) adapter 18. The I/O adapter 18 can connect to peripheral devices, such as disk unit 38 and program storage devices 40 that are readable by the system. The system can read the inventive instructions on the program storage devices 40 and follow these instructions to execute the methodology of the embodiments herein. The system further includes a subject interface adapter 22 that connects a keyboard 28, mouse 30, speaker 32, microphone 34, and/or other subject interface devices such as a touch screen device (not shown) to the bus 14 to gather subject input. Additionally, a communication adapter 20 connects the bus 14 to a data processing network 42, and a display adapter 24 connects the bus 14 to a display device 26, which provides a graphical subject interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

I claim:

1. A processor-implemented method for secure and real-time converting a volatile asset into another asset in a quantum-resistant blockchain network using an Artificial Intelligence (AI) model, comprising:

receiving, by a quantum computing volatile pay payment gateway (VP-PG) server, volatile asset conversion request and user preferences from a user through a user device, wherein the volatile asset conversion request comprises details of volatile assets to be exchanged, wherein the user preferences comprise conversion thresholds, and asset preferences;

personalizing, by the quantum-resistant blockchain network, the AI model by analyzing the user preference, and real-time behavioral patterns and historic data of the user and identifying patterns and correlations between the user preference, and the real-time behavioral patterns and the historic data of the user to personalize the AI model;

predicting, by the quantum-resistant blockchain network, value of each volatile asset over time using the personalized AI model, wherein the value of the volatile assets is predicted by analyzing real-time volatile asset data that is received from at least one of volatile asset servers, based on the user preferences and the volatile assets to be exchanged, wherein the real-time volatile asset data analyzed using quantum computing principle;

determining, by the quantum-resistant blockchain network, an optimal time to convert each volatile asset based on the predicted value of the volatile assets over the time;

converting, by the quantum-resistant blockchain network, each volatile asset into another asset preferred by the user, at the determined optimal time; and generating a smart contract on the quantum-resistant blockchain network to secure each volatile asset's conversation into another asset, wherein the smart contract comprises conditions for converting the volatile asset.

2. The processor-implemented method of claim 1, wherein the volatile asset conversion request is initiated when an identity (ID) of the user is verified through the quantum-resistant blockchain network using biometric authentication, wherein the identity (ID) of the user is verified using a Zero-Knowledge Proofs (ZKPs) method.

3. The processor-implemented method of claim 1, wherein the method comprises accessing the historic data of the user using the ZKPs method when personalizing the AI model.

4. The processor-implemented method of claim 1, wherein the quantum computing principles refer to use of quantum mechanics to improve a computational power of the personalized AI model in predicting value of each volatile asset by exploiting quantum parallelism and quantum entanglement to analyze multiple scenarios simultaneously.

5. The processor-implemented method of claim 1, wherein the method comprises enabling the volatile asset conversation through satellite IoT, thereby enabling high-speed volatile asset-based payment processing in remote areas, wherein the satellite IoT is linked to a quantum computing VP-PG server that is associated with the quantum-resistant blockchain network.

6. The processor-implemented method of claim 1, wherein the personalized AI model utilizes at least one of options pricing, derivatives trading, or over-the-counter (OTC) derivatives method to predict the value of each volatile asset over time.

7. The processor-implemented method of claim 1, wherein the volatile asset is used as collateral by generating the smart contract when the predicted value of the volatile assets meets a collateral threshold.

8. The processor-implemented method of claim 1, wherein the method further comprises receiving, at the quantum computing VP-PG server, a volatile asset transfer request from the user device that has scanned a Quick Response (QR) code linked to an entity's identity (ID);

processing the volatile asset transfer request at the VP-PG server using at least one of quantum computing methods to validate transaction data, wherein the volatile asset transfer request comprises at least one of digital signatures, an asset that needs to be transferred, the transaction data, and the converted volatile assets of the user; and securely transfer the asset from the converted volatile assets of the user to the entity ID by generating the smart contract.

9. The processor-implemented method of claim 8, wherein the method further comprises generating an invoice between the user and the entity using a Robotic Process Automation (RPA) when the asset is transferred to the entity ID.

10. A system for secure and real-time converting a volatile asset into another asset in a quantum-resistant blockchain network using an Artificial Intelligence (AI) model, comprising:

a quantum computing volatile pay payment gateway (VP-PG) server receives volatile asset conversion request and user preferences from a user through a user device, wherein the volatile asset conversion request comprises details of volatile assets to be exchanged, wherein the user preferences comprise conversion thresholds and asset preferences, wherein the quantum computing VP-PG server is communicatively connected to the quantum-resistant blockchain network, wherein the quantum-resistant blockchain network comprises a memory that comprises a set of instructions;

a processor that executes the set of instructions and is configured to:

personalize the AI model by analyzing the user preference, and real-time behavioral patterns, and historic data of the user and identifying patterns and correlations between the user preference, and the real-time behavioral patterns and the historic data of the user to personalize the AI model;

predict value of each volatile asset over time using the personalized AI model, wherein the value of the volatile assets is predicted by analyzing real-time volatile asset data that is received from at least one of volatile asset servers, based on the user preferences and the volatile assets to be exchanged, wherein the real-time volatile asset data analyzed using quantum computing principle;

determine an optimal time to convert each volatile asset based on the predicted value of the volatile assets over the time;

convert each volatile asset into another asset preferred by the user, at the determined optimal time; and generate a smart contract on the quantum-resistant blockchain network to secure each volatile asset's conversation into another asset, wherein the smart contract comprises conditions for converting the volatile asset.

* * * * *